(12) United States Patent
Heidebrink

(10) Patent No.: US 9,793,779 B2
(45) Date of Patent: Oct. 17, 2017

(54) ALTERNATOR ASSEMBLY HAVING COOLING AIR FLOW PASSAGES THERETHROUGH

(71) Applicant: Ron Heidebrink, Loris, SC (US)

(72) Inventor: Ron Heidebrink, Loris, SC (US)

( * ) Notice: Subject to any disclaimer, the term of this patent is extended or adjusted under 35 U.S.C. 154(b) by 0 days.

(21) Appl. No.: 15/075,885

(22) Filed: Mar. 21, 2016

(65) Prior Publication Data
US 2016/0276902 A1    Sep. 22, 2016

Related U.S. Application Data

(60) Provisional application No. 62/135,321, filed on Mar. 19, 2015.

(51) Int. Cl.
| | | |
|---|---|---|
| *H02K 9/04* | (2006.01) | |
| *H02K 5/20* | (2006.01) | |
| *F01P 1/06* | (2006.01) | |
| *H02K 11/04* | (2016.01) | |
| *H02K 9/06* | (2006.01) | |
| *H02K 16/00* | (2006.01) | |
| *H02K 11/05* | (2016.01) | |

(52) U.S. Cl.
CPC .............. *H02K 9/04* (2013.01); *F01P 1/06* (2013.01); *H02K 5/20* (2013.01); *H02K 9/06* (2013.01); *H02K 11/046* (2013.01); *H02K 11/05* (2016.01); *H02K 16/00* (2013.01)

(58) Field of Classification Search
CPC .. H02K 9/04; H02K 9/02; H02K 9/06; H02K 5/22; H02K 5/20; H02K 11/046; F01P 1/06

USPC ..................................................... 310/52–65
See application file for complete search history.

(56) References Cited

U.S. PATENT DOCUMENTS

| | | | |
|---|---|---|---|
| 6,570,293 B1 * | 5/2003 | Stroud | H02K 1/243 310/184 |
| 7,291,933 B1 | 11/2007 | Heidebrink | |
| 8,193,667 B2 | 6/2012 | Oohashi | |
| 8,860,265 B2 | 10/2014 | Galli et al. | |
| 8,933,599 B2 | 1/2015 | Tsuge | |
| 2005/0104460 A1 | 5/2005 | Kusase et al. | |
| 2007/0007847 A1 | 1/2007 | Maekawa et al. | |
| 2007/0205604 A1 | 9/2007 | Heidebrink | |
| 2008/0030084 A1 | 2/2008 | Tsuge | |
| 2008/0252081 A1 | 10/2008 | Heidebrink | |
| 2009/0237038 A1 | 9/2009 | Heidebrink | |
| 2010/0085706 A1 * | 4/2010 | Savant | H02K 5/20 361/689 |
| 2010/0283336 A1 * | 11/2010 | Vasilesco | H02K 9/04 310/62 |

(Continued)

*Primary Examiner* — Michael Andrews
(74) *Attorney, Agent, or Firm* — Shumaker, Loop & Kendrick, LLP

(57) ABSTRACT

An engine component cooling system and apparatus, at least one fan and a cover are installed upon the engine component. The fan pulls cool air and force cool air through the component assembly to reduce the heat generated through operation, thereby optimizing operation and extending the useful life of the individual components and the assembly. In one example, a fan and a cover are installed on an alternator assembly so that the fan draws in and forces cool air through the rectifier, rotor, stator, and out through the front of the assembly. The cover prevents cool air from being lost and misdirected, while directing the cool air through the assembly.

9 Claims, 10 Drawing Sheets

(56) References Cited

U.S. PATENT DOCUMENTS

2012/0019084 A1* 1/2012 Tsuge ................. H02K 5/20
310/59

* cited by examiner

ALTERNATOR ASSEMBLY HAVING COOLING AIR FLOW PASSAGES THERETHROUGH

I. RELATED APPLICATIONS

This application claims priority to U.S. Provisional Patent Application No. 62/135,321, filed on Mar. 19, 2015, the disclosure of which is hereby incorporated by reference in its entirety.

II. FIELD OF INVENTION

The present disclosure describes a cooling apparatus and system for engine components, and more particularly, a cooling system for engine components that rotate or turn.

III. MOTIVATION OF THE INVENTOR

There have been numerous attempts to provide a device, apparatus, or article to reduce the operating temperature of engine components, such as alternators. In particular, many devices have been introduced to reduce the heat of engine components, such as alternators, to extend the useful life of the components and optimize engine performance and operating life. In an alternator using diodes, the hottest areas are around the diodes and the copper wiring that passes through the stator(s), with the stator(s) wire(s) generating the highest amperage output.

One example of device used includes are engine or component mounted intakes and blowers. Single fans and/or blowers have been utilized, wherein the fans or blowers are rear mounted, face mounted, and/or rear and face mounted, and either internally or externally mounted. For example, the Delco 21SI and 22SI alternator comprises a single externally mounted fan at the face of the device to draw cool air through the alternator assembly. In another example, the Bosch AL9960LH alternator comprises a pair of internally mounted fans, one near the rear of the housing and one near the face of the housing. However, air flow is slowed by the spinning rotor(s) in an assembly, and to counteract this issue, many devices attempt to direct and/or force engine-heated air through the rotor; however, justifiably without success. When practicing this particular method, the air being directed or forced ("compelled air") to presumedly send cool air past the rotor(s) and to the alternator is engine-heated air—clearly not air having any degree of coolness. Thus, it is highly unlikely, if not impossible, to direct and/or force heated air (e.g., compelled air) to another proximate engine component having a substantially-similar temperature measure as the compelled air, and expecting the heated proximate engine component to be cooled when engaged by the heated compelled air. Similarly, Bosch commercially offers multiple rectifier cover ducts to enhance the engine heated air intake of an alternator (generator) assembly, providing different dimensions, angles, and partitions in an attempt to pull more air on to the electronics of the assembly.

However, such arrangements have demonstrated only superficial cooling of the alternator (or generator) assembly at large, because the air being pulled, pushed, or vented is heated air and it does not thoroughly penetrate through the entirety of the component structure and is instead vented to the environment. Accordingly, such devices often do not deliver the promised (or expected) cooling performance to the alternator (or generator) in light of the relative expense.

Accordingly, there is an unresolved need for better engine component cooling options that efficiently cool engine components at a minimum of expense to the automobile or equipment owner.

IV. SUMMARY

It is envisioned that the engine component cooling system (and related or associated apparatuses) described herein may be used in a variety of engines, including gasoline and diesel internal combustion engines, as well as in a variety of automobiles or conveyances, including passenger vehicles, motorcycles, boats, commercial hauling vehicles (vans, trucks, tractor-trailers), auto and motor racing equipment, construction equipment, airplanes, farm equipment, military vehicles, equipment, and the like. It is envisioned that the design and installation of the cooling system forces cool air about the individual elements or components of a larger engine component assembly, such as an alternator or generator, and through active cooling and the transfer of heat by forced air through the front (or rear) of the component assembly, the individual elements and the overall assembly will be cooled to an appropriate temperature for engine operation.

It is envisioned that the system and/or apparatuses may be controlled by internal and/or external voltage regulators. It is further envisioned that the system and/or apparatuses are of multi-voltage output (including 12 and 16 volts, 12 and 24 volts, or other such combinations), and multi-amperage output (including 12 v at 70 amps, and 24 volts at 30 amps, or other such combinations). The system and apparatuses described herein provide approximately 50% better cooling through improved air flow through the component assembly(ies) and better or preferential venting (when desired). Through improved cooling and cool-air delivery, the individual components or elements improves performance of the equipment, extends the maintenance schedule, extends the useful life, and provides cost savings through optimized performance and reduced costs in maintenance, repair, and replacement. In particular, it is envisioned that cool air is forced by and through the diodes and stator(s) wire(s), through the rotor, and out through the front area of the alternator.

V. BRIEF DESCRIPTION OF THE DRAWINGS

VI. DESCRIPTION OF THE EMBODIMENT(S)

A cooling system for engine components is envisioned as adaptable for a variety of components and assemblies that utilize rotating parts or elements, mounted in a manner to maximize cool air intake and delivery to the moving parts of the components and/or assemblies. An alternator (or generator) is an example of the type of component such a cooling system is useful. An alternator comprises a pulley, gear, at least one rotor R and at least one stator S or stator plate, a shaft coupled with the pulley, gear, and the rotor R and stator S, a rectifier and/or regulator assembly, and optionally one or more (carbon) brushes, and a vented housing. Other alternator configurations are contemplated, including double-stator/single-rotor alternators, brushless and brushing alternators, and alternators with or without a regulator. In the cooling system as described herein, the system includes a cover that envelops the housings of the rotor-stator R-S assembly, or the rotor-stator assembly R-S and the rectifier and regulator assembly T-G through 360 degrees, thereby pulling in cool air and forcing cool air throughout the system and minimizing the loss of cool air through venting. In accordance to another embodiment, the system may include at least one fan. As will be described in greater detail below, a variety of arrangements and configurations are contemplated.

Figure 1:
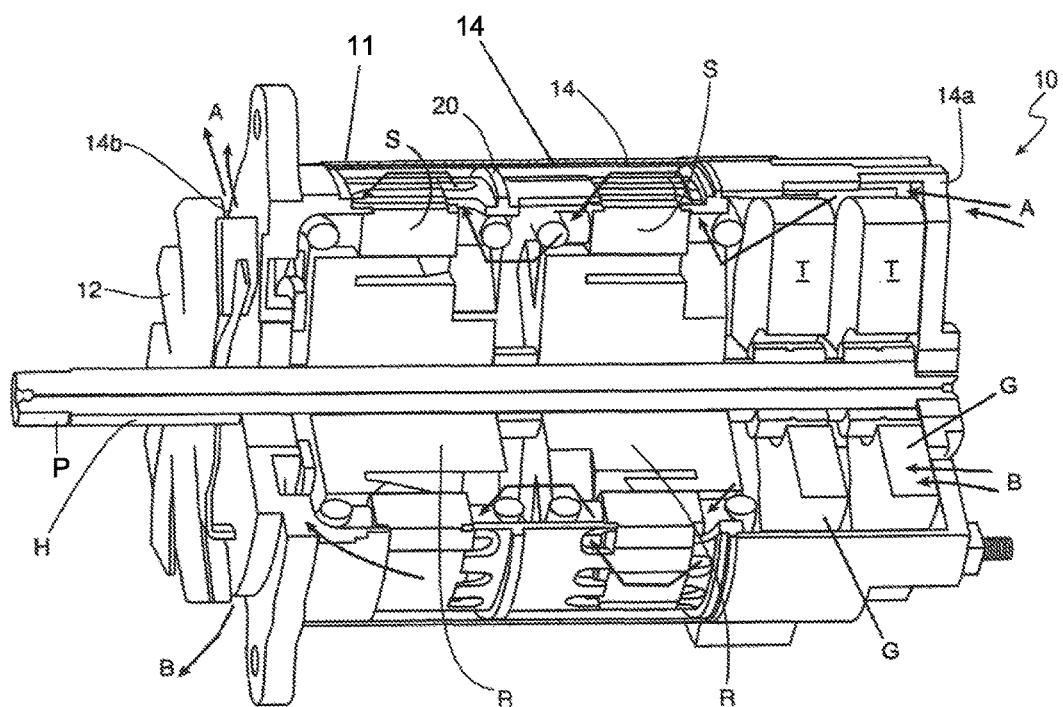
FIG. 1 is a side perspective view with partial cut-away of an alternator with the air flow cooling apparatus installed thereon.
Figure 2:
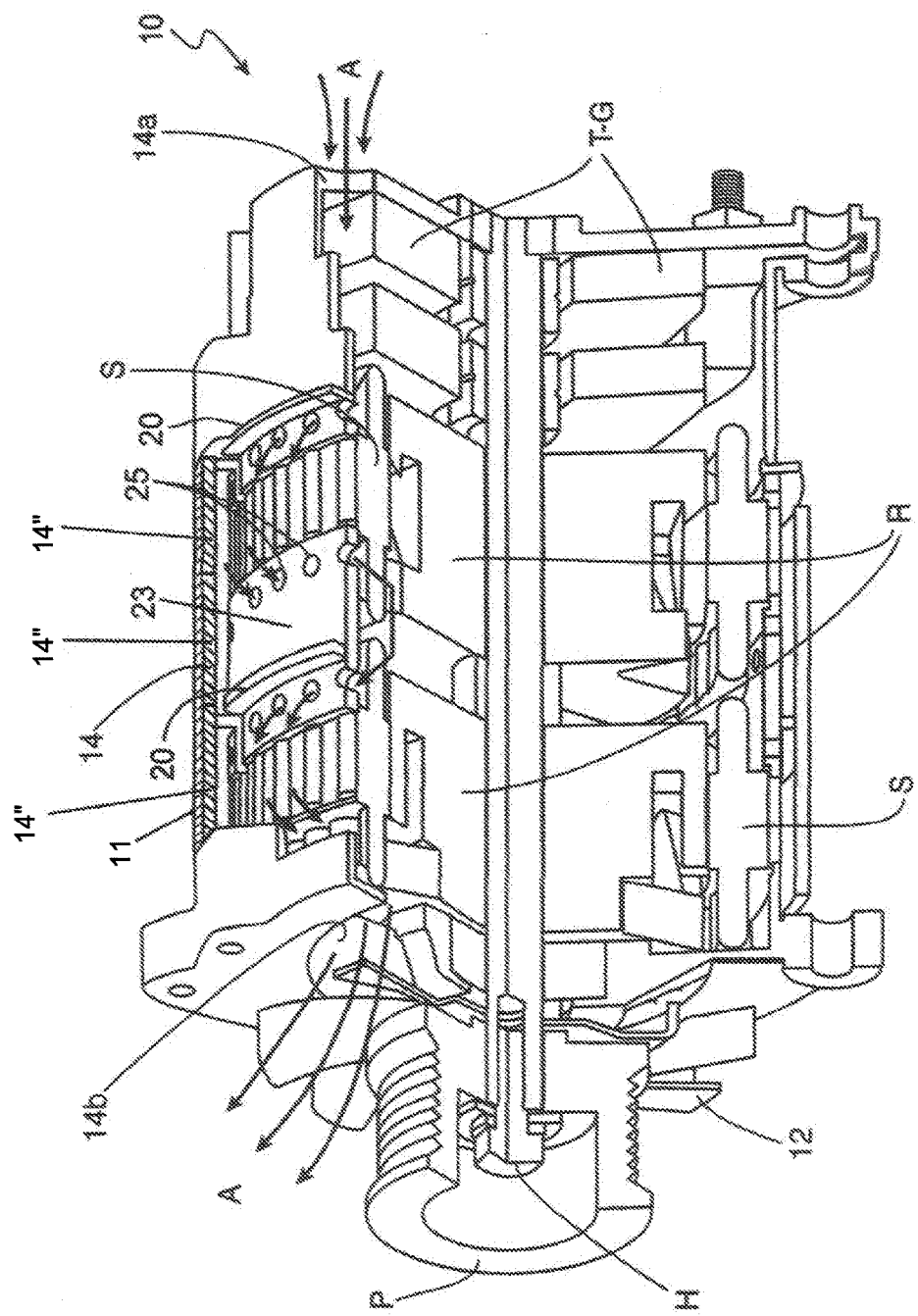
FIG. 2 is an alternative embodiment of the alternator depicted in FIG. 1 showing the cover comprising a plurality of shells.
Figure 2A:
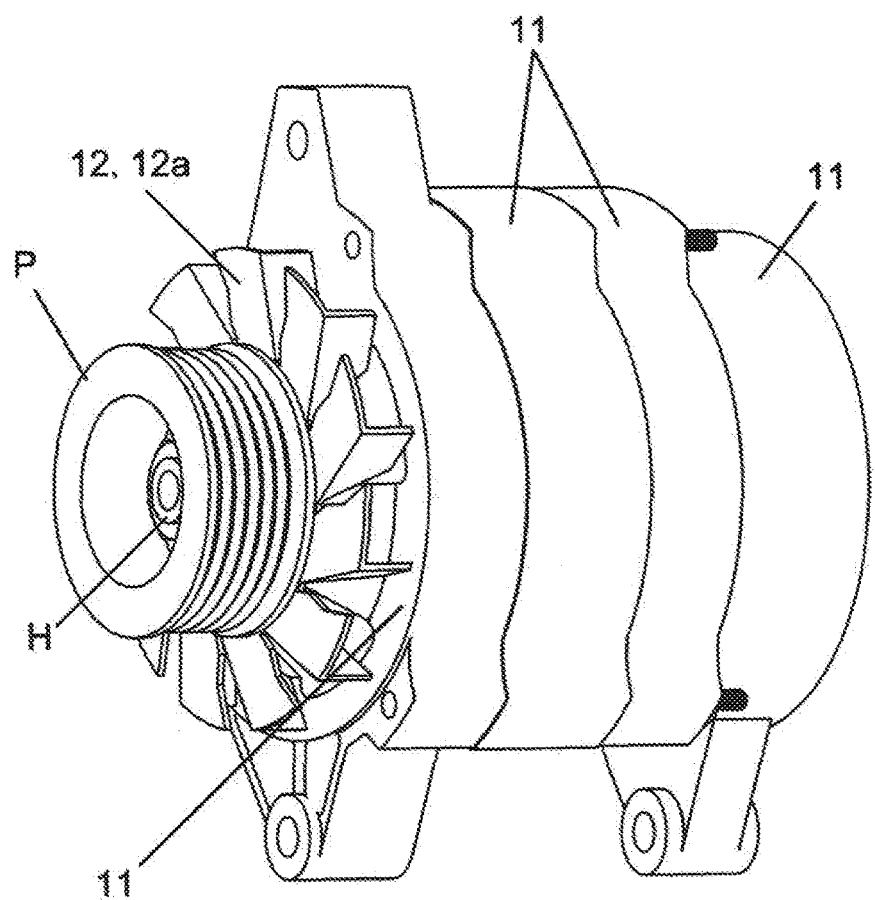
FIG. 2A is a perspective view of an alternator incorporated with an air flow cooling apparatus shown as a whole, in accordance to an alternate alternator embodiment of the present invention.
Figure 3:
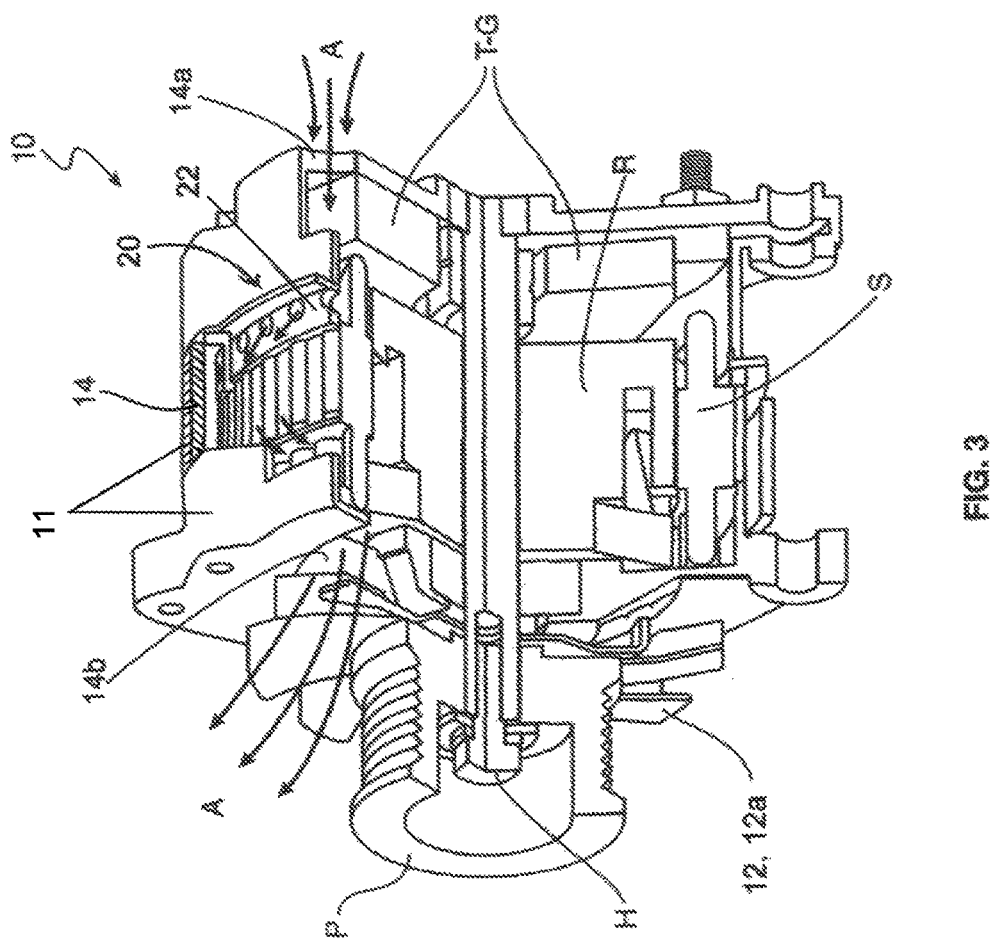
FIG. 3 is a perspective view of the alternator illustrated in FIG. 2A but with some of the parts shown cut away therefrom.

As depicted in FIG. 1 through FIG. 3, and in accordance with at least one embodiment envisioned herewith, a cooling system 10 comprises a cover 14, a pulley P and the rotor and stator assembly R-S, and may further include brushes or omit brushes (e.g., brushless). A shaft H is rotationally coupled with the pulley P and the rotor R, so as the pulley P rotates, the shaft H also rotates the rotor R (generating the current desired).)

Figure 4:
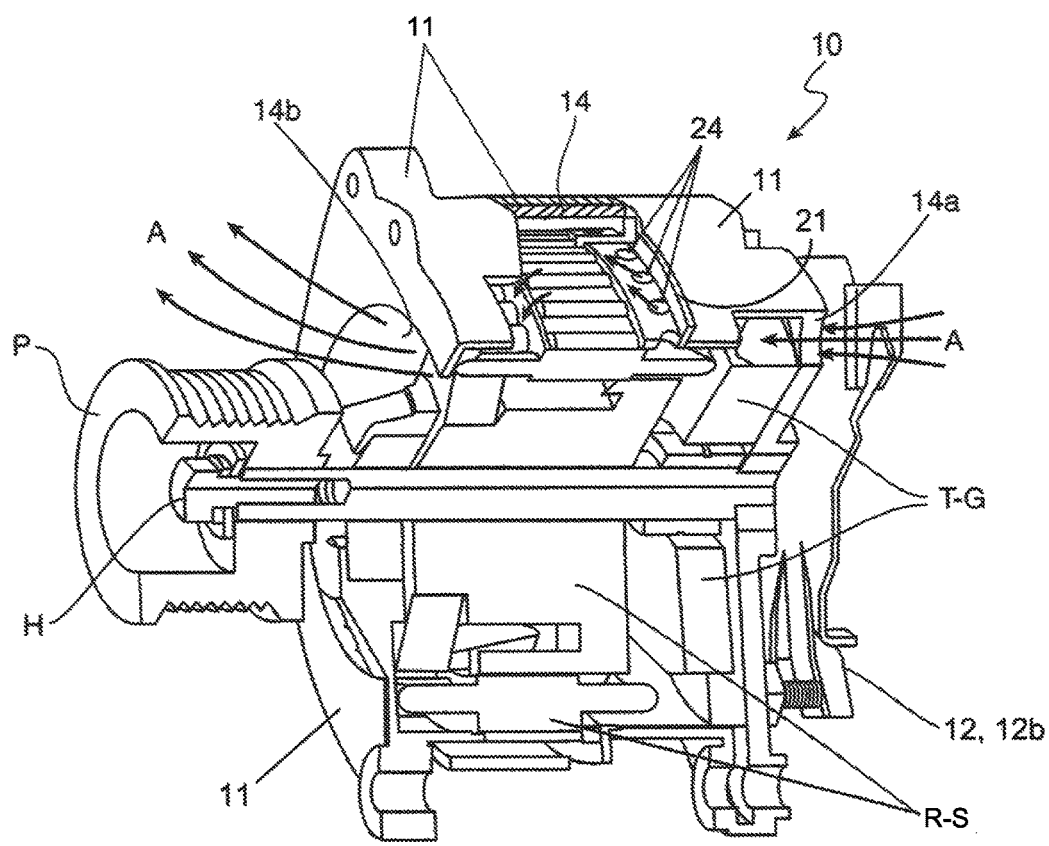
FIG. 4 is an alternative embodiment of the alternators depicted in FIGS. 1-3A.

In accordance to another embodiment, the cooling system 10 comprises at least one externally mounted fan 12 and a cover 14. As incorporated into an alternator assembly, as depicted, the system 10 comprises a fan 12 mounted between the pulley P and the rotor and stator assembly R-S, and may include brushes or omit brushes (e.g., brushless). A shaft H is rotationally coupled with the pulley P and the rotor R, so as the pulley P rotates, the shaft H also rotates the rotor R (generating the current desired). It is also envisioned that gear and/or other means may be used in substitution or supplementation to the pulley P depicted to cause the rotor to spin or rotate. In the embodiments depicted by FIGS. 1-3, the fan 12 is externally mounted adjacent the pulley P and rotor R, but other configurations are contemplated and depicted in additional figures and disclosure herein. In particular, multiple fans may be utilized, and the fans may be mounted externally, internally, and/or in combination (one internal and one external). In particular reference to FIG. 3, the cooling system 10 comprises a single fan 12, more specifically, a fore fan 12a or forward fan. In FIG. 4, a cooling system 10 is depicted also comprising a single fan 12, the fan 12 being an aft fan 12b or rear fan.

Figure 2B:
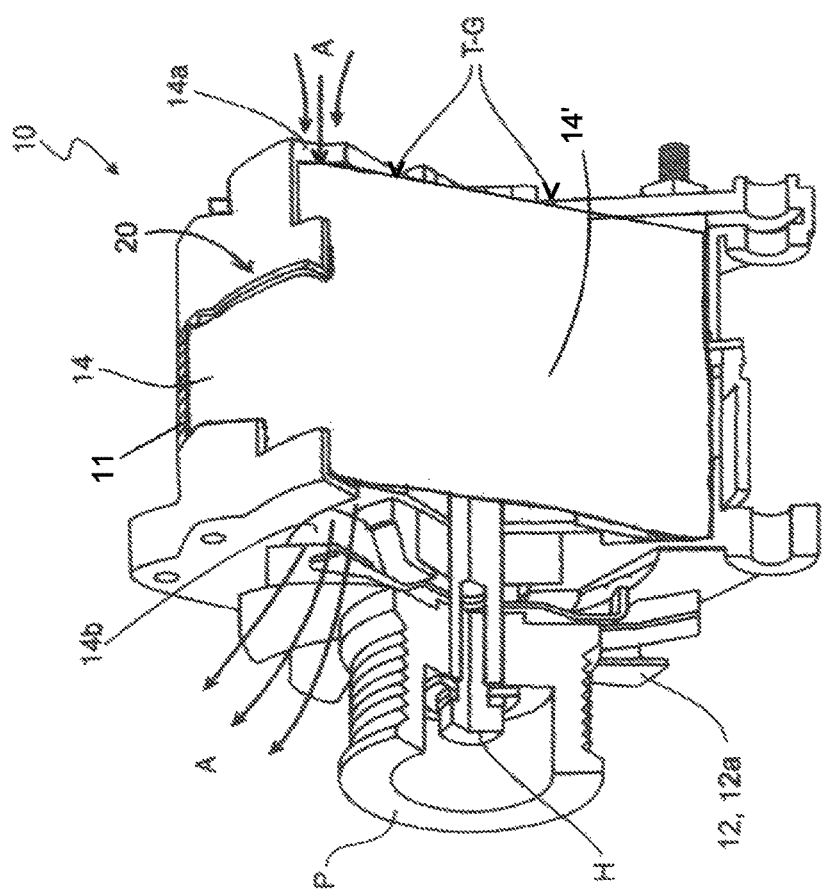
FIG. 2B is a perspective view of an alternator incorporated with an air flow cooling apparatus partially shown in cross-sectional view illustrating the cover component encircling the rotor-stator assembly and the rectifier and regulator assembly through 360 degrees along a radial direction perpendicular to the shaft, in accordance to an alternate embodiment of the present invention.
Figure 3A:
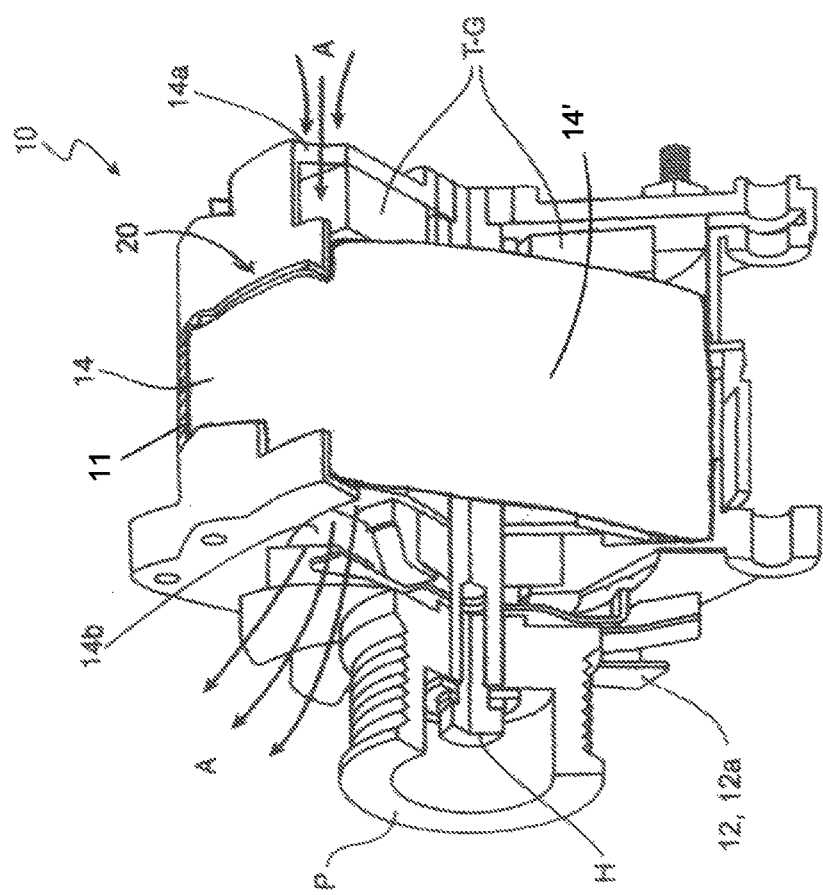
FIG. 3A is a perspective view of FIG. 3 depicted as a partial cross-sectional view illustrating the cover component encircling the rotor-stator assembly through 360 degrees along a radial direction perpendicular to the shaft.

The cover 14 is mounted to the housing 11 (as best shown in FIGS. 2B, 3A and 4) that encircles the rotor-stator assembly R-S (FIG. 3A), or both the rotor-stator assembly R-S and the rectifier and regulator assembly T-G (FIGS. 2B and 4). The housing 11 comprises a front section and a rear section. The cover 14 encircles the assemblies R-S and T-G through 360 degrees along a radial direction perpendicular to the shaft H (as drawn), thereby leaving inlet and outlet openings 14a and 14b at the rear and front sections, respectively, of the housing 11, generally. In one embodiment, such as that depicted in FIGS. 2 and 3, a single region or area is provide for one or more inlets (denoted by directional arrow "A"). In another embodiment, such as that depicted in FIG. 1, multiple regions or areas may be provided for one more inlets (denoted by directional arrows "A" and "B", respectively). In still another embodiment, the cover 14 comprises a single shell 14' that envelops the rotor-stator assembly R-S (FIG. 3A), or both the rotor-stator assembly R-S and the rectifier and regulator assembly T-G (FIG. 2B). In yet another embodiment illustrated in FIG. 2, the cover 14 comprises a plurality of shells 14", wherein the plurality of shells 14" may envelop the rotor-stator assembly R-S, or both the rotor-stator assembly R-S and the rectifier and regulator assembly T-G. It is also envisioned that the inlet and outlet openings 14a and 14b may be adjustable to widen or lessen the openings as desired, change the angle of entry, and/or focus the cool-air at a specific area or region of the alternator assembly should a specific alternator assembly prove to be difficult to cool in certain regions. Generally, it is envisioned that cool air is pulled through the inlets 14a formed in the rear of the alternator assembly, though other arrangements or configurations are possible.

In order to direct cool-air flow, and more particularly, to force the flow of cool-air through the stator S, an air dam 20 is provided (as depicted in FIGS. 3-4). The air dam 20 is disposed above the stator S, and contiguous to the cover 14. The air dam 20 may be coupled or connected to the cover 14, or the dam 20 may be integrally molded with cover 14. The air dam 20 may comprise a base portion 22 from which a planar panel portion 21 upwardly depends. The base portion 22 comprises a series of air vent apertures 24 defined therethrough.

The cover 14 envelops the housing of the rotor-stator assembly R-S, or the housings of the R-S and T-G assemblies, substantially closing off all vents to prevent loss of cool-air and to create a substantially axial cool-air pathway (denoted by the directional arrows "A" (in FIGS. 2, 3, and 3A) and "B" (in FIG. 1)). In preventing cool-air loss via venting but creating a substantially axial cool-air pathway A flowing to the fan 12, cool-air is forced through all parts of the housing of the R-S and T-G assemblies, and particularly around and through stator windings Sa, wherein the stator windings Sa may be constructed of copper wire winding, round copper wire winding, square copper wire winding, rectangular copper wire winding, standard multiple copper wires, Hairpin-type copper conductors, and any combination thereof, thereby maximizing the cool-air that contacts the engine components and reducing the operating temperature thereof.

FIG. 4 depicts a single rotor R and stator S and with the fan 12 mounted to the rear of the alternator assembly. The rear-mounting of the fan 12 may be external (as shown), or internal (not depicted), provided that the fan is adjacent or near the rectifier T (and/or regulator if provided). In this capacity, the fan 12 draws and pushes cool air into the alternator assembly through inlet(s) 14a, and with the cover 14 in place, the cool air is forced onto and through the elements or components of the alternator assembly.

Referring now more specifically to FIG. 3, and in accordance to one exemplary operation of the cooling system 10 of the present invention, the fore fan 12a is driven via an engine (not shown) which creates a vacuum in view of the substantially sealed environment provided by the cover 14. At the rear of housing 11, cooler air is pulled into inlet openings 14a at A. The cooler air is pulled around the regulator G and rectifier T, up through the stator windings Sa from the rear of the stator(s) S. The cover 14 imparts unique, unanticipated and nonobvious functional features and advantages resulting in a substantially-improved cooling system 10 being unanticipated and nonobvious when analyzed, under strict scrutiny, against prior art alternators, and similar devices. The unique system and method for cooling an alternator or similar device as provided by the present invention is further described hereinafter. The cover 14, which encircles the assemblies R-S and T-G through 360 degrees, as previously described, functions to seal the front and rear sections of the housing 11, thereby creating negative pressure and a path along which cooler air travels and crosses over the stator(s), from which the air then travels down into, in between, and around stator windings Sa on the front of stator(s) S. From the front of stator(s) S, the air (still under negative pressure), is pulled forward and expelled through the outlet openings 14b of front section of housing 11 via the turning of fan 12.

The method and process as previously described is also applied, or is otherwise repeated for the embodiments illustrated in FIGS. 1 and 2, wherein each system 10 embodiment comprises pair of rotor-stator assemblies R-S and a pair of rectifier and regulator assemblies T-G, whereby cooler air is pulled into inlet openings 14a and circulates through the two stators, and rotors, and into, in between, and around stator windings Sa of each stator S of the pair of stators S. When viewed from the interior, each of the systems 10 includes a pair of air dams 20 with vent apertures 24 (as previously described). The pair of air dams 20 are spaced relative to one another via a spacer plate 23 or spacer section, wherein the spacer plate 23 may be integrally molded with the pair of air dams 20 so as to provide a unitary component, or otherwise contiguously connected or suitably coupled between the pair of dams 20. The spacer plate 23 includes a series of air vent apertures 25 defined therethrough.

Figure 5:
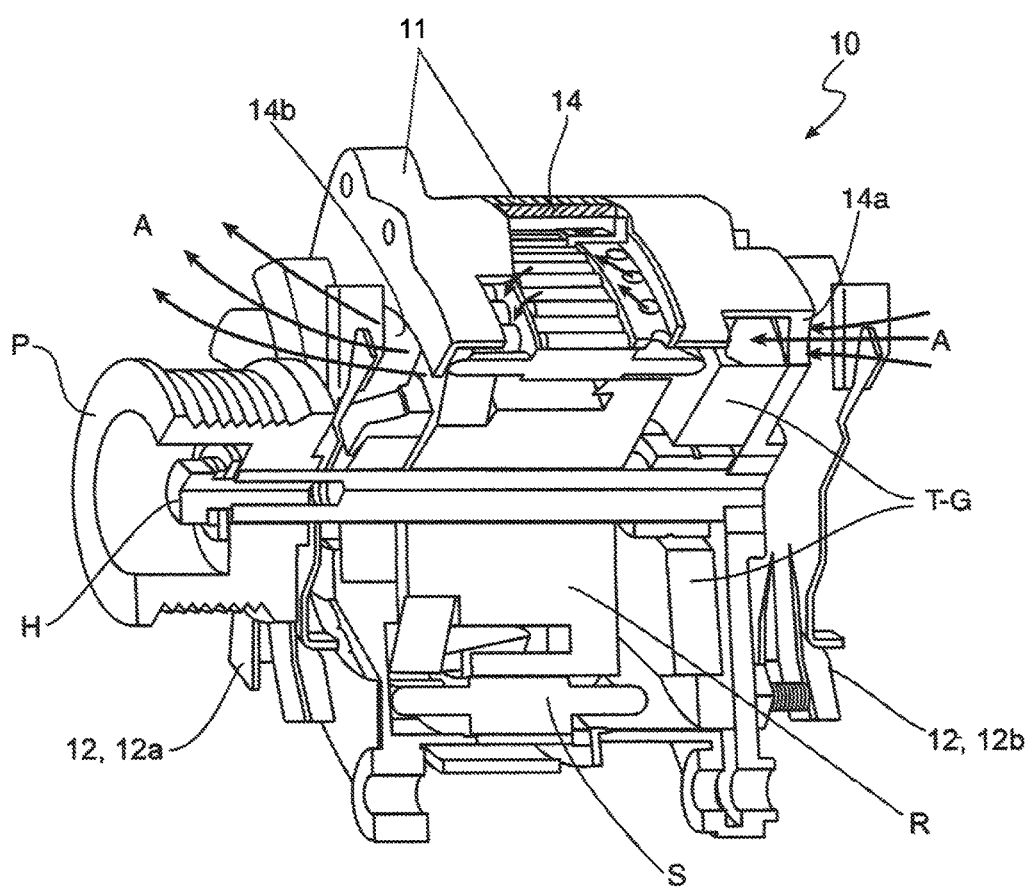
FIG. 5 is an alternate embodiment of the alternators depicted in FIGS. 1-4.

FIG. 5 depicts a single rotor R and stator S but with a pair of fans 12a and 12b mounted at the front and rear, respectively, of the alternator assembly 10. As depicted, the fans 12a and 12b are externally mounted so the front fan 12a adjacent the rotor R and the rear fan is adjacent or near the rectifier T. However, it is contemplated that one or both fans 12a, 12b (in FIG. 5) may be internally mounted as well. With two fans 12a, 12b, the rear fan 12b draws and pushes air into the alternator assembly 10, the cover 14 prevents venting of cool air and helps force cool air throughout the alternator assembly 10, and the front fan 12a draws cool air (and any venting heated air) through the outlets 14b at the front of the alternator assembly 10.

It is also envisioned that the rectifier T may be mounted either internally (as depicted) or externally. Likewise, the regulator G may be mounted either internally or externally. It is also envisioned that the combination may be mounted internally, externally, or with one mounted internally and one mounted externally.

It is envisioned that one or more fans may be mounted so as to either pull air through, push air through, or in combination, push-and-pull air through the alternator (or other engine component).

Figure 6:
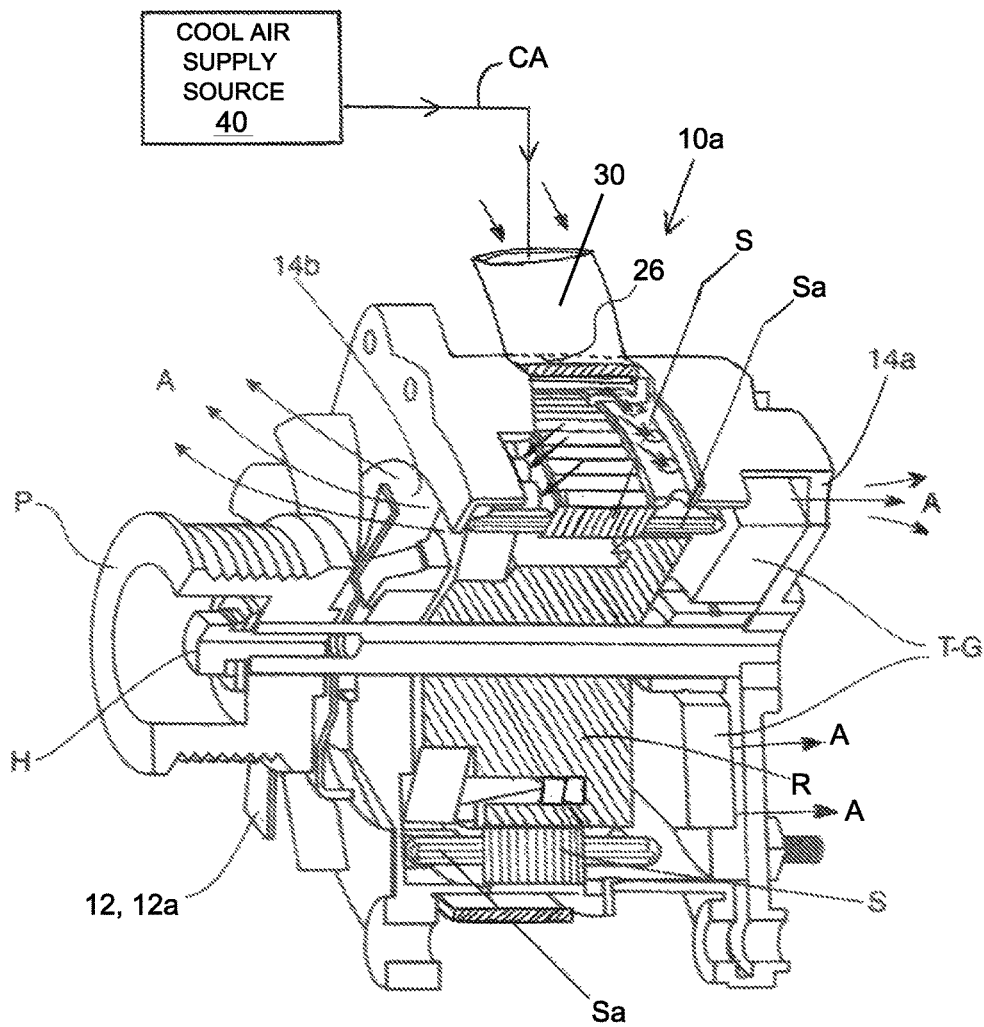
FIG. 6 is a partial cross-sectional view illustrating a cooling system, in accordance to another alternate embodiment of the present invention.

In reference to FIG. 6, and in accordance to another embodiment, the cover 14 comprises a cylindrical, air-intake collar 30 by which cool air is directed into the interior of the alternator assembly 10a via cool ambient air, or an air supply source 40 or ambient air supply source, such as an electric blower (not shown), electric cool air pump (not shown), or other mechanical air supply source. The collar 30 may be molded integral to the cover 14 or sealably coupled thereto, and wherein collar 30 is in open fluid communication with the interior of the cover 14 via an opening 26 defined through cover 14. In FIG. 6, the collar 30 is shown extending integrally from the cover 14. Cool air CA is directed into and through the air-intake collar 30 (via air supply source 40) and through the cover 14 (via opening 26) and is forced to travel towards the front of the alternator assembly 10a, passing around and through the exposed stator windings Sa of the stator(s) S. The cool air CA is also concurrently forced to travel towards the rear of the alternator assembly 10a, down through the exposed stator windings Sa, and through and around the regulator(s) G and rectifier(s) T, and expelled through both the outlet openings 14b of the front section of housing 11 and the openings 14a of the rear section of housing 11. Significantly, the openings 14a provided in the rear section of the housing 11 in the embodiment illustrated in FIG. 6 (and FIG. 6A) function as outlet openings, in lieu of inlet openings corresponding to previously-described cooling system 10 embodiments, such as the systems 10 illustrated in FIGS. 2-4.

Figure 6A:
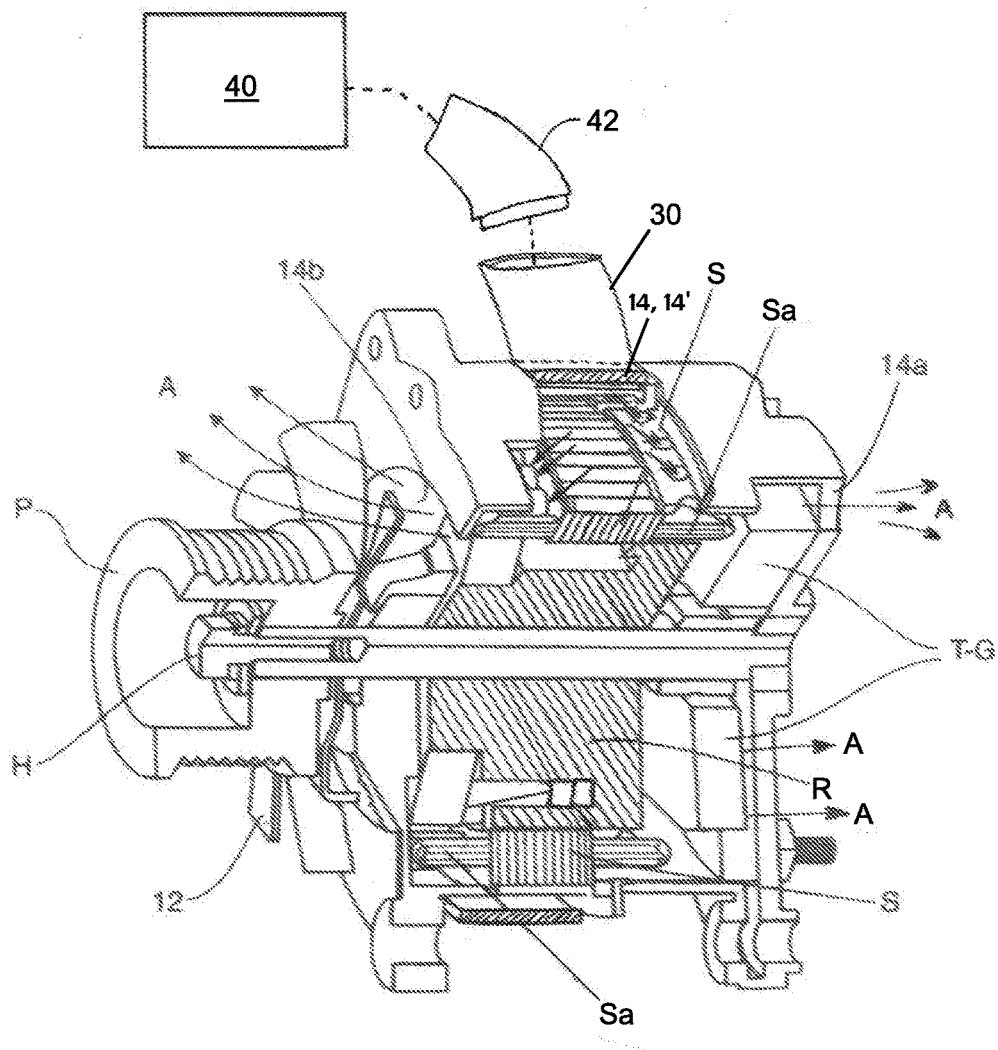
FIG. 6a is the alternator depicted in FIG. 6 showing an adapter for interconnecting the air in-take collar to an air supply source.

In reference to FIG. 6A, in order to facilitate compatibility by the present invention with most, if not all commercially-available air supply sources 40, a cylindrical or tubular adapter 42 is disclosed. The adapter 42 is adapted and configured to sealably interconnect the air-intake collar 30 to the air supply source 30 in a detachably secured manner. The adapter 42 is particularly suited as an after-market or retrofit device allowing the cooling system and assemblies 10, 10a of the present invention to be utilized and optimally operate with most, if not all, commercially-available air supply sources 40. Once the adapter 42 is installed, the air supply source 40 and collar 30 are in sealed, fluid communication.

The alternator assemblies 10a as shown in FIGS. 6 and 6A are each equipped with internally-mounted stator, regulator, and rectifier T. However, the above-described cooling method is also applicable for cooling the interior, and interior components, of alternator assemblies not equipped with internally-mounted regulator(s) G, and rectifier(s) T, and of alternator assemblies with externally-mounted regulator(s) G, and rectifier(s) T. In addition, the above-described cooling method may be utilized to cool the interior, and interior components, of alternator assemblies with or without brushes and fans. In view of the in view of the sealed environment provided by the cover 14, alternator assemblies mounted with one or more fans, e.g., a fore fan 12a and/or an aft fan 12, pulls cool air CA in a cyclical fashion which cools the interior alternator components. In FIGS. 6 and 6a, only a single fan 12a is shown; however, it is contemplated and clearly envisioned that a second or aft fan 12b may also be mounted to the alternator assembly 10a embodiments illustrated.

In accordance to yet still another embodiment, it is envisioned that an insulative cover, sleeve, or jacket may also be used as an insulator for the improved, unique alternator as described herein, and as an after-market device for a conventional alternator, when the vehicle (including heavy industrial machinery and equipment, aircraft, and the like as previously disclosed herein) is in operation and when not in operation, for purposes of shielding (insulating) the alternator from/against engine or motor heat. In this manner, the insulative cover configuration allows the alternator to maintain a level or degree of temperature invariability, regardless of the heat (and particularly excessive heat) generated by the proximate motor or engine during operation thereof.

According to one exemplary embodiment, the insulative cover is wrapped around the alternator cover 14 so as to envelop a substantial majority of the external wall or external circumferential sidewall thereof. A means for detachably securing the insulative cover in the wrapped position is disclosed, the securing means comprising a member of the group which includes, but is not limited to, adhesive (such as for adhering the opposed free side edges of the cover to one another), clips, fasteners, coupling devices, biased metal annular holders, metal bands, and other suitable fastening devices.

In accordance to one embodiment, the insulative cover may be constructed of a metal material, such as aluminum, a flexible or semi-flexible material forming a panel structure. The construction material may selected from the group which includes, but is not limited to, liquid-crystal polymers, composite thermoplastics, silicone, polyester, and polyester fiberglass resin systems, and combinations thereof.

The insulative cover structure may further comprise a fibers matrix for reinforcing the cover. The reinforcing fibers or matrix of fibers may be broadly described as fiber-reinforced plastics, the reinforced fibers may be selected from the group which includes, but is not limited to, polyester-polyarylate (sold commercially under the trademark Vectran®), polyphenylene sulfide, polyimide, polyamide-imide, polyetheretherketone, and combinations thereof.

The insulative cover is envisioned to be manufactured utilizing a molding process, such as compression molding. However, it is contemplated the insulative cover may also be manufactured using other molding processes and techniques which include injection molding, transfer molding, blow molding, extrusion, and other molding and manufacturing methods.

In order to impart resistance to abrasions and water, the insulative cover may further include an outer layer in the form of a coating, such as a polyester coating or a polyurethane coating.

According to another embodiment, the insulative cover may be constructed of a material allowing said insulative cover to be adapted and configured to be wrapped around the alternator cover 14 in a snug-fitting manner, whereby the insulative cover flexibly conforms to and adapts to the outer contour and shape of the alternator cover 14. Once the insulative cover is removed from the alternator cover 14, the returnably-resilient quality of the insulative cover material allows the insulative cover to return to its resting shape (generally planar).

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. An alternator assembly, comprising:
    a housing having a front end, a rear end, a closed sidewall, a plurality of air inlets opening through the rear end, and a plurality of air outlets opening through the front end;
    at least one rotor and at least one stator disposed in the housing;
    a rotating shaft disposed in the housing, a portion of the rotating shaft extending outside of the housing beyond the front end;
    a pulley or gear rotatably coupled to the rotating shaft and disposed outside of the housing; and
    at least one fan rotatably coupled to the rotating shaft;
    wherein an axial air pathway is provided between the at least one stator and the closed sidewall, and wherein rotation of the shaft rotates the at least one fan thereby drawing air in through the plurality of air inlets, through the axial air pathway passed the at least one rotor and the at least one stator, and out through the plurality of air outlets.

2. The alternator assembly according to claim 1, wherein the at least one fan is disposed outside of the housing between the front end and the pulley or gear.

3. The alternator assembly according to claim 1, wherein the at least one fan is disposed outside of the housing adjacent the rear end.

4. The alternator assembly according to claim 1, wherein the at least one fan is disposed within the housing near the front end.

5. The alternator assembly according to claim 1, wherein the at least one fan is disposed within the housing near the rear end.

6. The alternator assembly according to claim 1, wherein the at least one fan includes a first fan disposed within the housing and a second fan disposed outside of the housing.

7. The alternator assembly according to claim 1, further comprising an air dam disposed between a radial extent of the at least one stator and the closed sidewall, the air dam having a base including a plurality of air vents therethrough arranged to direct air flow through the housing radially outward and away from the at least one stator.

8. The alternator assembly according to claim 1, further comprising an air intake opening through the closed sidewall of the housing, the air intake coupled with a cold air supply source adapted to supply cold air to an interior of the housing in a direction of the front end.

9. The alternator assembly according to claim 1, wherein the closed sidewall is covered with an insulative sleeve for insulting the alternator assembly from ambient heat.

* * * * *